Sept. 15, 1931.  O. WITTEL  1,823,245
MOTION PICTURE FILM WINDING DEVICE
Filed May 9, 1929  2 Sheets-Sheet 1

Inventor
Otto Wittel
By Newton N. Perrins
Donald H. Stewart

Sept. 15, 1931.  O. WITTEL  1,823,245
MOTION PICTURE FILM WINDING DEVICE
Filed May 9, 1929   2 Sheets-Sheet 2
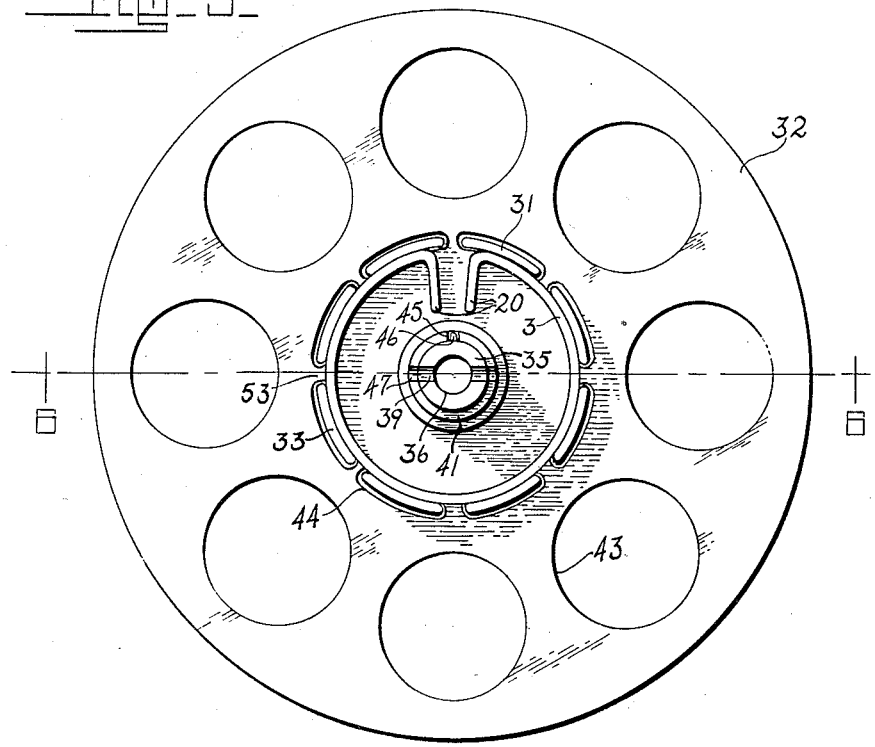
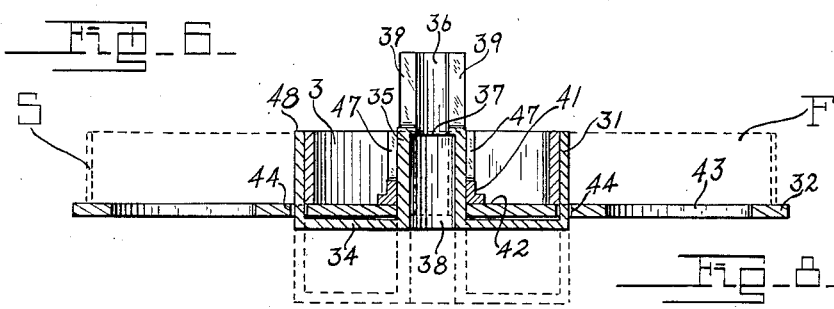
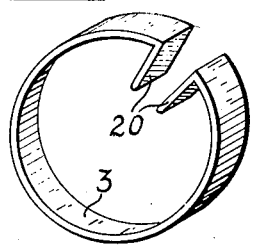
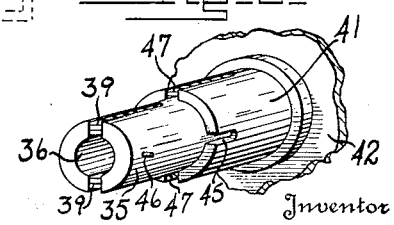
Inventor
Otto Wittel
By Newton M. Perkins
Donald H. Stewart
Attorneys Patented Sept. 15, 1931

1,823,245

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

MOTION PICTURE FILM WINDING DEVICE

Application filed May 9, 1929. Serial No. 361,693.

This invention relates to photography and more particularly to devices for winding coils of motion picture film particularly adapted for use with non-rewind systems. One object of my invention is to provide a device for winding motion picture film on a hub from which the film coil can be readily removed. Another object of my invention is to provide a device of the character described including a hub and a single flange mounted to slide axially of the hub. Another object of my invention is to provide a film winding reel in which the hub member is made up of a plurality of arms which are mounted to slide through apertures in a single flange so that the flange may traverse the length of the hub. Another object of my invention is to provide a film winding device including a pair of hubs, one adapted to fit inside of the other and both being adapted to support an inner convolution of a coil of film at different times. Another object of my invention is to provide a film winding device in which a film coil can be readily displaced from one hub to another by merely moving a flange across the width of one hub; and other objects will appear from the following specification, the novel features being particularly pointed out in the claims at the end thereof.

In my co-pending application, Serial Number 361,692, for film winding device for motion picture apparatus filed May 9, 1929, I have shown a system for winding motion picture film from one reel to another in such a manner that it may be again shown without rewinding. In this system the film is drawn from an inner convolution of a supply reel and wound on an outer convolution of a take-up reel.

The present invention is particularly directed to the provision of a suitable take-up reel from which a film coil may be displaced so that it can be moved to a temporary hub for either storage or for re-projection purposes.

Coming now to the drawings wherein like reference characters denote like parts throughout:

Figure 5 is a side elevation of a film winding device constructed in accordance with and embodying another form of my invention.

Figure 6 is a section on line 6—6 of Figure 5.

Figure 7 is a perspective view of a temporary or spring hub member which may be used with both of the illustrated forms of my invention, and Figure 8 is a fragmentary perspective view of the power shaft engaging part of the winding device shown in Figure 5.

Figure 1:
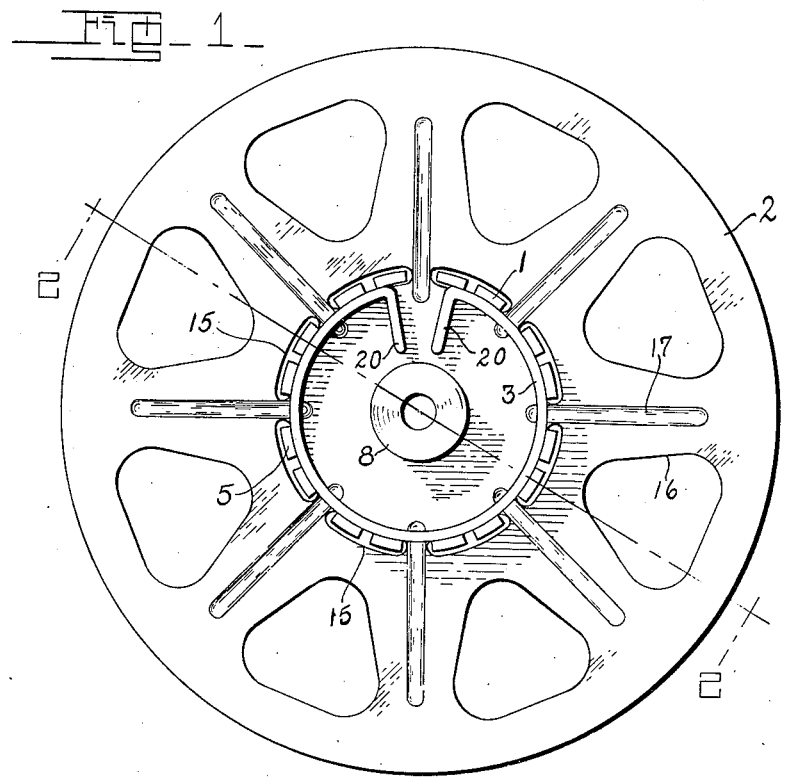
Figure 1 is a side elevation of a preferred type of film winding device constructed in accordance with and embodying a preferred form of my invention.
Figure 3:
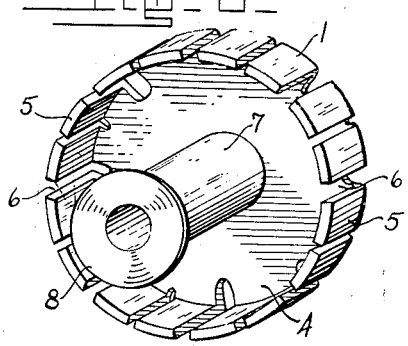
Figure 3 is a perspective view of the hub member before having a flange member assembled thereon.
Figure 4:
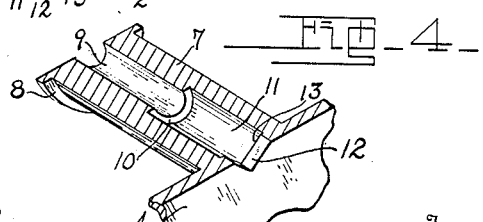
Figure 4 is a fragmentary detail in section of that portion of the hub member which is adapted to engage a power driven shaft.

In the embodiment shown in Figure 1 the film winding device consists broadly of a main hub member 1 on which a single flange 2 is slidably mounted and inside of which a temporary spring hub member 3 may be placed. As best shown in Figure 3 the hub member 1 may be made from a circular plate 4 having a plurality of arms 5 bent from the periphery of plate 4 to form an annular hub member having a plurality of slots 6 extending between the various arms. To the plate 4 is attached a shaft member 7, as best shown in Figures 3 and 4, this shaft member having a flange 8 on its outer end.

The shaft is preferably hollow having one portion 9 connected through a shoulder 10 to an enlarged diameter opening 11. In the flange 4 there is a square opening 12 so that a shoulder 13 exists between the apertured portion 11 and the flange 4, this being adapted to receive one of the well known round-square driving shafts which are widely used on amateur motion picture machines. The latch usual with such machines snaps behind the shoulder 13.

The shaft 7 may be power driven and by turning the hub member 1 the entire winding device is rotated by power.

On the outside of shaft 7 there is a sleeve 14, this sleeve being firmly attached to the flange 2. Flange 2 is provided with a series of apertures 15 which, as best shown in Figure 1, are of a sufficient size to permit the arms 5 of the hub member to slide freely therethrough when the sleeve 14 slides on the shaft 7.

The flange 2 is preferably also provided with openings 16 to reduce the weight of the winding device and embossings or ribs 17 may extend between these openings to increase the rigidity of the flange.

Figure 2:
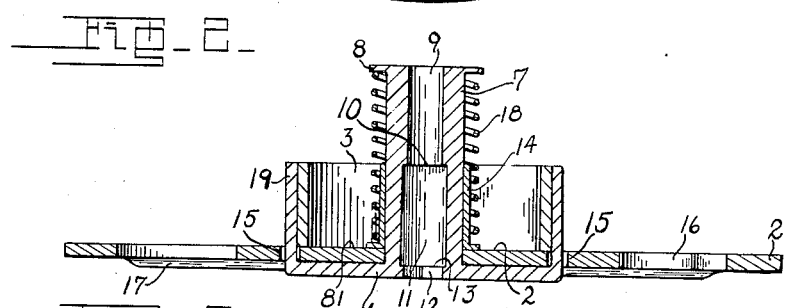
Figure 2 is a section on line 2—2 of Figure 1.

As shown in Figure 2 a coil spring 18 extends between the flange 8 and the inner surface 81 of the flange 2. This spring tends to hold the parts in the position shown in Figure 2 with the winding surface 19 of the hub 1 in position to receive a coil of film.

The temporary hub 3 is preferably made of spring metal and is provided with a pair of inwardly extending operating handles 20. The hub 3 may be placed inside of the hub 1 by pressing the handles together and moving it inside of the arms 5.

When a coil of film has been wound upon the hub 1 and the winding operation is complete, the flange 2 may be moved axially of the hub 1 against the pressure of the spring 18 and this will move both the coil of film and the temporary hub member relative to the main hub member until the film coil is moved from the ends of the arms 5 at which time the temporary hub 3 will spring outwardly and engage an inner convolution of the film coil.

As fully described in my above identified co-pending application it is customary to place a strip around the outside of a film coil wound on the present winding device before removing it from the hub since the strap on the outside and the temporary spring hub on the inside hold a film convolution in shape.

A second embodiment of my invention is shown in Figures 5 to 8 inclusive. In this embodiment the hub member 31 is mounted to slide relative to and axially of a flange member 32, the hub member 31 being adapted to receive a temporary spring hub member 3 which is exactly the same as that described above.

The hub member designated broadly as 31 may be formed by bending a plurality of arms 33 from the periphery of a circular plate 34 to which there is fixedly attached a shaft 35, this shaft preferably being hollow.

Shaft 35 may have a bore 36 connected by a shoulder 37 with an enlarged bore 38. A portion of the shaft is slotted on both sides at 39, this slot being adapted to receive a latch member which is used on well-known types of amateur projection machines.

A sleeve 41 is mounted to slide on the outside of shaft 35 and is attached at 42 to the flange 32. This flange is preferably provided with openings 43 to reduce the weight of the flange and with a plurality of openings 44 through which the arms 33 of the hub member may freely slide. In order to limit the movement of flange 32 relative to the hub 31 there is a slot 45 in one side of the sleeve adapted to engage a pin 46 carried by shaft 35. This limits the outward movement of the sleeve relative to the shaft.

The other limit of the relative movement between the two parts is the abutment formed by plate 34 since the flange 32 may only slide until it strikes this plate.

Sleeve 41 is also provided with a pair of oppositely disposed slots 47, these slots being of substantially the same width as slots 39 this being best shown in Figure 5. The reason for these slots is that it is desirable at times to slide sleeve 41 on shaft 35 while the latter is engaged by a latch member passing through a slot 39. The slot 47 permits this to be done.

With a winding device constructed in accordance with the second embodiment of my invention the temporary hub member 3 may, by compressing the handles 20, be slid inside of the hub member formed by the arms 33. After a convolution of film indicated in Figure 6 at F in broken lines has been wound upon the reel the flange 32 may be slid to traverse the hub 31 thus simultaneously thrusting the film convolution F and the temporary hub 3 from the main hub 31 and as the edges 48 slide through the slots 44 the temporary hub 3 springs outwardly and engages the inner convolution of the film coil F.

As fully described in my above mentioned co-pending application a strap diagrammatically illustrated at S should be placed around the outside of the film convolution before removing it from the reel.

With both of the embodiments shown in the drawings the operation of the film winding device is as follows. The winding devices are placed on the power driven take-up shaft of a motion picture projector with their shafts 7 or 35 in engagement and having driving connection with the power driven shafts of the machine.

After the film has been threaded through the machine in the usual manner an end of the film may be placed between one of the slots 6 extending between the arms 5 or one of the slots 53 extending between the arms 33 of the hub member according to which embodiment is employed. A temporary spring hub 3 may be then inserted and allowed to spring out against the hub member and into engagement with the end of the film. The machine then moves the film from a supply reel to the take-up device and after a film coil is completely wound upon the take-up device a strap S may be placed about the outer convolution of film and the film coil may then be moved upon the temporary hub member 3 by moving the flange relative to the hub.

This film winding device makes the operation of positioning a coil of film on a temporary hub a simple one which can be quickly and easily performed. The coil of film removed from the winding device may be supported by a take-up reel and may be projected by drawing from the center convolution of the film as fully described in my co-pending application above referred to.

Having thus described my invention, what I claim as new and desire to secure by Letters Patent is:

1. In a winding device for motion picture film, the combination with a flange, of a pair of concentric hub members, one hub being slidably carried by the flange, and means for separating the two hub members by sliding the flange on one hub.

2. In a winding device for motion picture film, the combination with an apertured flange, of a hollow hub member slidable through the apertured flange, a second spring hub member adapted to engage the inside of the hollow hub member, said second spring hub member being movable from contact with the hollow hub member by sliding the hollow hub member through the flange.

3. In a winding device for motion picture film, the combination with a main hub member open on one side, of a removable hub member adapted to fit inside of the hub member from the open side thereof, a flange mounted slidably with respect to the main hub member, and having a portion thereof engaging said removable hub member when fitted inside of the main hub member, said hub members being separable one from the other by sliding the flange relative to the hub.

Signed at Rochester, New York, this 7th day of May, 1929.

OTTO WITTEL.